(12) United States Patent
Takahira et al.

(10) Patent No.: US 11,091,004 B2
(45) Date of Patent: Aug. 17, 2021

(54) AIR CONDITIONING UNIT FOR VEHICLE

(71) Applicant: DENSO CORPORATION, Kariya (JP)

(72) Inventors: Shunsuke Takahira, Kariya (JP); Yohei Shimoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 564 days.

(21) Appl. No.: 16/077,056

(22) PCT Filed: Nov. 23, 2016

(86) PCT No.: PCT/JP2016/084686
§ 371 (c)(1),
(2) Date: Aug. 10, 2018

(87) PCT Pub. No.: WO2017/141514
PCT Pub. Date: Aug. 24, 2017

(65) Prior Publication Data
US 2021/0197641 A1    Jul. 1, 2021

(30) Foreign Application Priority Data
Feb. 17, 2016  (JP) .............................. JP2016-028254

(51) Int. Cl.
*B60H 1/00* (2006.01)
*B60H 1/32* (2006.01)

(52) U.S. Cl.
CPC ........... *B60H 1/00064* (2013.01); *B60H 1/32* (2013.01); *B60H 1/00028* (2013.01); *B60H 1/00521* (2013.01); *B60H 2001/00092* (2013.01)

(58) Field of Classification Search
None
See application file for complete search history.

(56) References Cited

U.S. PATENT DOCUMENTS

| | | | |
|---|---|---|---|
| 2012/0199661 A1* | 8/2012 | Hara ................. | B60H 1/00528 236/92 B |
| 2015/0021858 A1 | 1/2015 | Richter et al. | |
| 2015/0033781 A1 | 2/2015 | Hyakuda et al. | |
| 2016/0311291 A1* | 10/2016 | Shimoyama ....... | B60H 1/00471 |
| 2020/0062073 A1* | 2/2020 | Shimoyama ....... | B60H 1/00064 |

FOREIGN PATENT DOCUMENTS

DE    102013107601 A1    1/2015
JP    2007261372 A    10/2007

* cited by examiner

*Primary Examiner* — Marc E Norman
(74) *Attorney, Agent, or Firm* — Harness, Dickey & Pierce, P.L.C.

(57) ABSTRACT

An air conditioning unit includes an air conditioning case, a connector that is attached to an end of a first pipe connected to a first heat exchanger, a second pipe connected to a second heat exchanger, and a gasket being a sheet in shape. The gasket includes a first opening and a second opening. The gasket is adhered to a contact surface of the air conditioning case with the connector inserted into the first opening and with the second pipe inserted into the second opening. The periphery of the second opening in the gasket is compressed by the second pipe. The gasket includes a surface including an adhesive area that includes at least a periphery of the first opening and an adhesive-less area that includes at least a periphery of the second opening. The adhesive is applied to the adhesive area and is not applied to the adhesive-less area.

3 Claims, 8 Drawing Sheets

AIR CONDITIONING UNIT FOR VEHICLE

CROSS REFERENCE TO RELATED APPLICATIONS

This application is a U.S. National Phase Application under 35 U.S.C. 371 of International Application No. PCT/JP2016/084686 filed on Nov. 23, 2016 and published in Japanese as WO/2017/141514 A1 on Aug. 24, 2017. This application is based on and claims the benefit of priority from Japanese Patent Application No. 2016-028254 filed on Feb. 17, 2016. The entire disclosures of all of the above applications are incorporated herein by reference.

TECHNICAL FIELD

The present disclosure relates to an air conditioning unit for a vehicle that supplies a conditioned air into a vehicle compartment.

BACKGROUND

Conventional air conditioning units for a vehicle includes a gasket that is interposed between a peripheral portion defining a through-hole in a partition member of a vehicle body and an air conditioning case. The partition member separates an interior space of the vehicle compartment from the exterior space of the vehicle compartment. The through-hole allows a pipe, which is connected to a heat exchanger of the air conditioning unit, to pass therethrough. The gasket prevents a foreign material such as air or water from coming into the vehicle compartment from outside of the vehicle compartment through the through-hole (refer to Patent Literature 1 for example).

The through-hole defined in the partition member includes a first through-hole and a second through-hole. The first through-hole allows a first pipe, which is connected to a first heat exchanger configured to cool air, to pass therethrough. The second through-hole allows a second pipe, which is connected to a second heat exchanger configured to heat air, to pass therethrough. In general air conditioning units, the first through-hole and the second through-hole are sealed by separate gaskets respectively.

PRIOR ART LITERATURE

Patent Literature

Patent Literature 1: JP 2007-261372 A

SUMMARY

The inventors of the present disclosure considered the following air conditioning unit for a vehicle in which the first through-hole and the second through-hole defined in the partition member are sealed by a single gasket that is a sheet in shape The air conditioning unit for a vehicle includes an air conditioning case and a first heat exchanger and a second heat exchanger arranged inside the air conditioning case. The air conditioning case includes a contact surface. The gasket is positioned on the contact surface. A connection member, which is attached to the first pipe connected to the first heat exchanger, and the second pipe, which is connected to the second heat exchanger, each protrude from the contact surface. The connection member and the second pipe are proximate to each other. As such, the single gasket being the sheet in shape is used. The gasket includes a first opening and a second opening. The gasket is adhered to the contact surface with the connection member arranged in the first opening and with the second pipe is arranged in the second opening.

An opening width of the second opening is set smaller than an outer diameter of the second pipe to seal a periphery of the second pipe gas-tightly. An opening width of the first opening is set larger than or equal to an outer dimension of the connection member. As such, when the connection member is connected to a connection member of an object after mounting the air conditioning unit to the vehicle, the gasket is prevented from being interposed between the two connection members.

Here, the inventors of the present disclosure put an adhesive to an entire surface of the gasket adjacent to the air conditioning case so as to fix the gasket to the air conditioning case. In this case, when the gasket is positioned on the contact surface and the second pipe is inserted into the second opening, the second pipe is stuck by the adhesive. As a result, the second pipe may not be inserted into the second opening smoothly. Furthermore, the gasket may be damaged. As described above, the inventors of the present disclosure found that an ease of attaching the gasket to the air conditioning case may deteriorate.

Then, the inventors of the present disclosure considered not to use an adhesive to prevent the second pipe from being stuck by the adhesive. However, the inventors found the following two possible abnormalities.

The first possible abnormality is as follows. The opening width of the second opening is set smaller than the outer diameter of the second pipe. As such, when the gasket is positioned on the contact surface, a periphery of the gasket proximate to the second opening is compressed by the second pipe. As a result, a portion of the gasket adjacent to the second opening is fixed to the air conditioning case. On the other hand, the opening width of the first opening is set larger than or equal to the outer dimension of the connection member. As such, a portion of the gasket adjacent to the first opening is not fixed to the air conditioning case. As a result, when the air conditioning unit with the gasket positioned on the contact surface is mounted to the vehicle, the portion of the gasket adjacent to the first opening separates from the contact surface. Therefore, the gasket may not be interposed between the air conditioning case and the partition member appropriately. For example, the gasket may be interposed between the air conditioning case and the partition member in a state of being bent.

The second possible abnormality is as follows. The inventors of the present disclosure further considered to set the opening width of the first opening to be smaller than the outer dimension of the connection member such that the portion of the gasket adjacent to the first opening is fixed to the air conditioning case certainly. However, in this case, the gasket may be deformed when inserting the connection member into the first opening. A part of the deformed gasket may cause a connection failure between the connection member and the connection member of the object. For example, a part of the deformed gasket may be interposed between the connection member and the object. As a result, the connection failure between the connection member and the object may occur.

It is an objective of the present disclosure to provide an air conditioning unit for a vehicle that can secure fixing of a gasket to an air conditioning case and that can improve the fixing of the gasket to the air conditioning case.

In the present disclosure, an air conditioning unit for a vehicle supplies a conditioned air into a vehicle compartment. The air conditioning unit includes an air conditioning case, a first heat exchanger, a first pipe, a connector, a second heat exchanger, a second pipe, and a gasket. The air conditioning case defines an air passage therein allowing air to flow therethrough toward the vehicle compartment. The first heat exchanger is positioned in the air conditioning case. The first heat exchanger is configured to cool the air by a heat exchange between the air and a refrigerant circulating in a refrigeration circuit. The first pipe is connected to the first heat exchanger and allows the refrigerant to flow therethrough. The connector is attached to an end of the first pipe and connects the first pipe to an object. The second heat exchanger is positioned in the air conditioning case. The second heat exchanger is configured to heat the air by a heat exchange between the air and a heat medium. The second pipe is connected to the second heat exchanger and allows a heat medium to flow therethrough. The gasket is a sheet in shape. The gasket is interposed between a partition member and the air conditioning case and fixed to the air conditioning case. The partition member partitions an inside of the vehicle compartment and an outside of the vehicle compartment. The air conditioning case includes a contact surface being in contact with the gasket. The connector and the second pipe each protrude from the contact surface. The gasket includes a first opening and a second opening. The gasket is adhered to the contact surface by an adhesive with the connector inserted into the first opening and with the second pipe inserted into the second opening. The first opening has an opening width larger than or equal to an outer dimension of the connector. A portion of the gasket proximate to the second opening is compressed by the second pipe along a direction away from the second pipe. The gasket includes a surface adjacent to the air conditioning case. The surface includes an adhesive area and an adhesive-less area. The adhesive area includes at least a periphery of the first opening and is with the adhesion applied thereon. The adhesive-less area includes at least a periphery of the second opening and is without the adhesion applied thereon.

In the air conditioning unit of the present disclosure, a part of the gasket proximate to the first opening serves as the adhesive area to which the adhesive is applied. As such, the first-opening-side area of the gasket is fixed to the air conditioning case by the adhesive. The second-opening-side area of the gasket is fixed to the air conditioning case with the gasket being pressed against the second pipe. Thus, according to the air conditioning unit of the present disclosure, the gasket can be fixed to the air conditioning case certainly.

In addition, in the air conditioning unit of the present disclosure, a part of the gasket proximate to the second opening serves as the adhesive-less area to which the adhesive is not applied. As such, when assembling the gasket to the contact surface with the adhesive, the second pipe can be prevented from being stuck by the adhesive. Thus, according to the air conditioning unit of the present disclosure, fixing the gasket to the air conditioning case can be improved.

For example, the part of the gasket proximate to the second opening may be compressed when an opening width of the second opening is smaller than an outer diameter of the second pipe before inserting the second pipe into the second opening.

DESCRIPTION OF EMBODIMENTS

Figure 1:
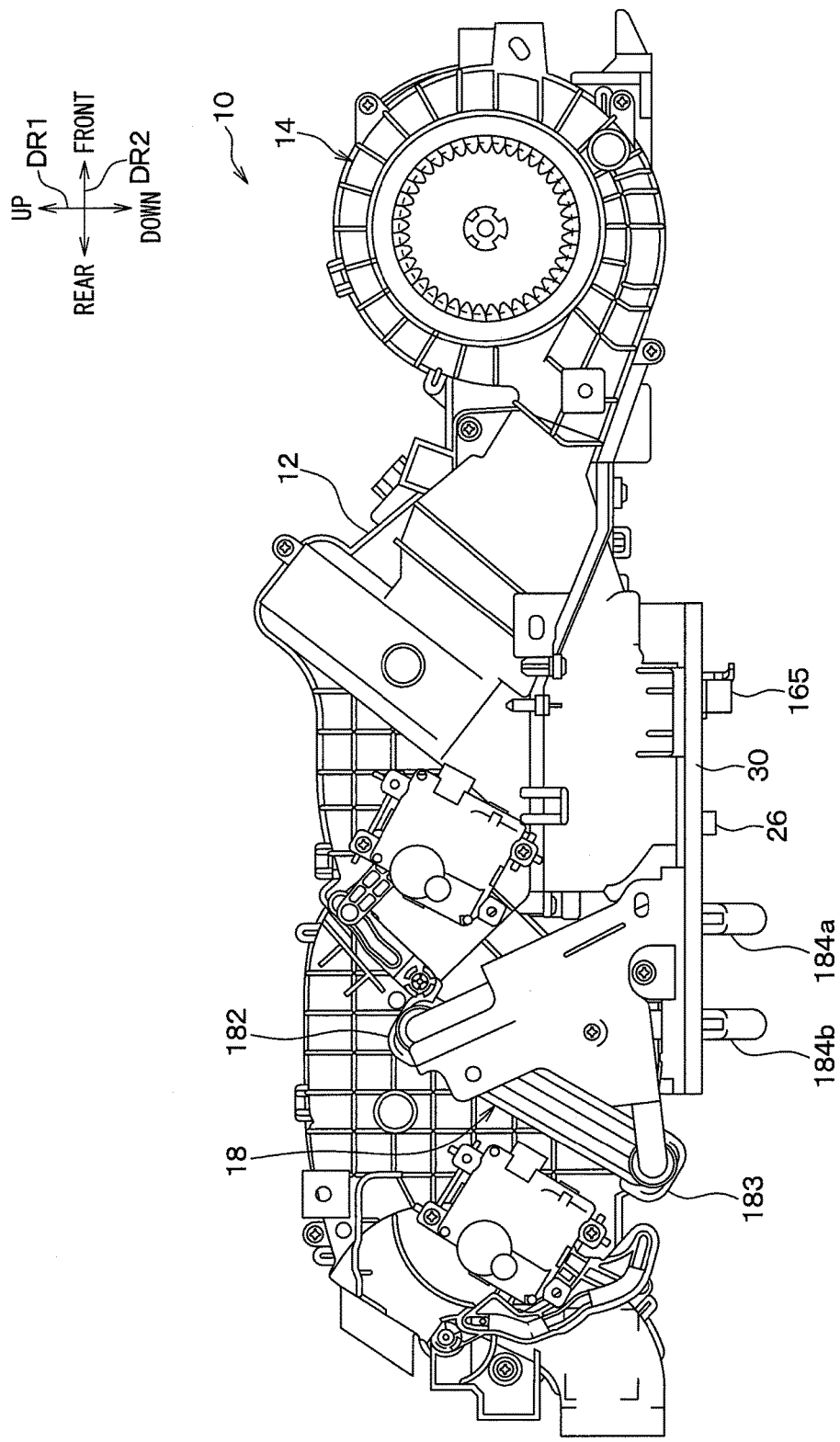
FIG. 1 is a side view of an air conditioning unit for a vehicle in a first embodiment.

A plurality of embodiments will be described with reference to the drawings. In the following embodiments, the same or equivalent parts are denoted by the same reference numerals as each other, and explanations will be provided to the same reference numerals. For ease of description, orientation indicator DR1, DR2, or DR3 showing the up-down direction the front-rear direction, and the left-right direction are provided in the drawings with an air conditioning unit for a vehicle mounted to the vehicle. Specifically, the orientation indicator DR1 shows the up-down direction DR1 of the vehicle. The orientation indicator DR2 shows the front-rear direction DR2 of the vehicle. The orientation indicator DR3 shows a vehicle width direction DR3 (i.e., the front-rear direction DR3) of the vehicle. The up-down direction DR1, the front-rear direction DR2, and the vehicle width direction DR3 are perpendicular to each other.

First Embodiment

An air conditioning unit 10 for a vehicle in the present embodiment is illustrated in FIG. 1. The air conditioning unit 10 for a vehicle will be simply referred to as the air conditioning unit 10 hereafter. The air conditioning unit 10 configures a part of an air conditioner for a vehicle including a compressor and a condenser located outside a vehicle compartment in the vehicle. The vehicle includes an interior panel that partitions a vehicle compartment of the vehicle. The interior panel includes a center console that separates the driver's seat and the passenger's seat from each other. The air conditioning unit 10 is positioned inside the center console. The air conditioning unit 10 serves as an air conditioning unit for a rear seat and is configured to perform air conditioning for a passenger having a rear seat located on a rear side of a front seat including the driver's seat and the passenger's seat.

Figure 2:
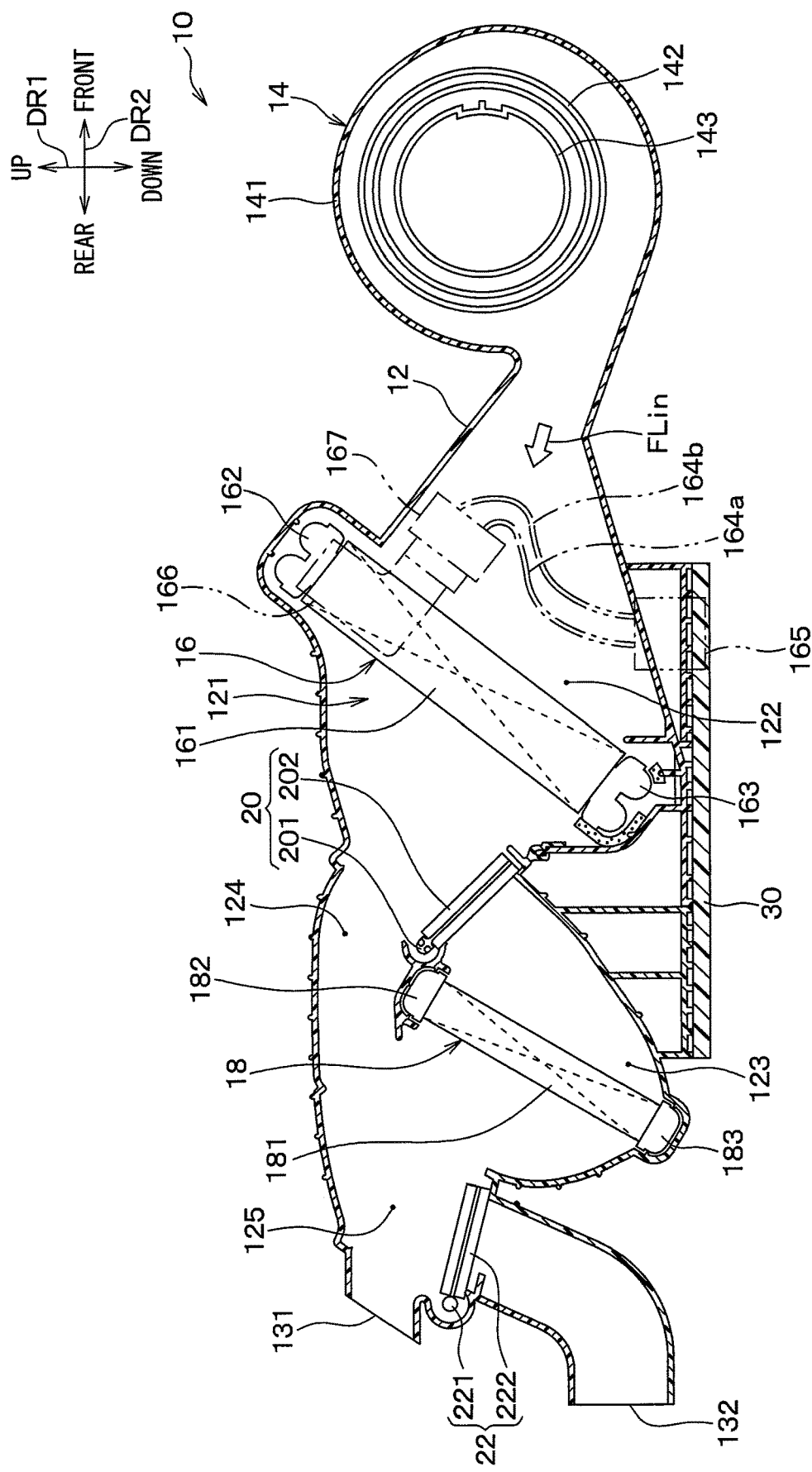
FIG. 2 is a cross-sectional view of the air conditioning unit viewed from the same direction as FIG. 1.

As shown in FIG. 2, the air conditioning unit 10 includes an air conditioning case 12, a blower 14, an evaporator 16, a heater core 18, an air mixing door 20, and an outlet door 22.

The blower 14 is connected to an upstream side of the air conditioning case 12 in a flow direction of air. The blower 14 is a centrifugal blower and blows air into the air conditioning case 12. The blower 14 includes a blower case 141, a centrifugal fan 142 in the blower case 141, and a fan motor 143. The blower case 141 is connected to the air conditioning case 12. The centrifugal fan 142 is configured to draw and discharge air when being rotated. The fan motor 143 rotates the centrifugal fan 142. When the centrifugal fan 142 rotates, the blower 14 discharges the air toward the evaporator 16 housed in the air conditioning case 12 as shown by an orientation indicator FLin.

The air conditioning case 12 is made of resin. The air conditioning case 12 together with the blower case 141 configures a housing of the air conditioning unit 10. The air conditioning case 12 defines, as an air passage, the case passage 121 therein. The case passage 121 allows the air to flow therein toward the vehicle compartment. The case passage 121 is subdivided by a structure provided in the air conditioning case 12. That is, the case passage 121 is divided into an upstream air passage 122, a warm air passage 123 as a first air passage, a cool air passage 124 as a second air passage, and an air mixing space 125.

The upstream air passage 122 includes an upstream end and a downstream end. The upstream end is connected to a blowing outlet of the blower 14. The downstream end is connected to the warm air passage 123 and the cool air passage 124. The cool air passage 124 serves as a bypass passage that allows the air from the upstream air passage 122 to flow therethrough while bypassing the warm air passage 123. In the present embodiment, the cool air passage 124 is located above the warm air passage 123.

The air mixing space 125 is a space connected to a downstream end of the warm air passage 123 and a downstream end of the cool air passage 124. The air after passing through the warm air passage 123 and the air after passing through the cool air passage 124 are mixed with each other in the air mixing space 125.

The evaporator 16, together with a compressor, a condenser, and an expansion valve (not shown), configures a well-known refrigeration cycle device configured to circulate the refrigerant. The evaporator 16 is a first heat exchanger that allows the refrigerant to flow therein and that allows air to pass therethrough. The evaporator 16 is configured to perform a heat exchange between the air and the refrigerant thereby evaporating the refrigerant and cooling the air.

The evaporator 16 is positioned in the upstream air passage 122. As such, the evaporator 16 cools the air that flows into the upstream air passage 122 from the blower 14 as indicated by the arrow FLin. The evaporator 16 causes the cool air to flow to one or both of the warm air passage 123 and the cool air passage 124.

The structure of the evaporator 16 is the same as the well-known evaporator used for an air conditioner for a vehicle. Specifically, the evaporator 16 includes a core 161, a first header tank 162, and a second header tank 163. The first header tank 162 and the second header tank 163 are connected to both ends of the core 161 respectively. The evaporator 16 is arranged in the upstream air passage 122 so that the first header tank 162 is located above the second header tank 163.

The core 161 of the evaporator 16 includes a plurality of refrigerant tubes and a plurality of fins. The refrigerant tubes each are in fluid communication with the header tanks 162, 163. The refrigerant tubes and the fins are stacked alternately with each other. The core 161 has a structure in which the refrigerant tubes and the fins are alternately stacked in the vehicle width direction DR 3. In the evaporator 16, the refrigerant having a low temperature and flowing through the refrigerant tubes exchanges heat with the air passing through the core 161, whereby the air is cooled. In the present embodiment, the refrigerant tubes each are arranged to be inclined with respect to the up-down direction DR 1.

A pair of refrigerant pipes 164a, 164b is connected to the evaporator 16 through an expansion valve 167. The pair of refrigerant pipes 164a, 164b each allows the refrigerant to flow therethrough. A connector 165 is attached to ends of the pair of refrigerant pipes 164a, 164b. The pair of refrigerant pipes 164a, 164b is positioned inside the air conditioning case 12.

Specifically, the expansion valve 167 is connected to the first header tank 162 via a connection member 166. The pair of the refrigerant pipes 164a, 164b each includes one end and the other end. The one ends of the pair of refrigerant pipes 164a, 164b are connected to the expansion valve 167. One of the pair of the refrigerant pipes 164a, 164b allows the refrigerant to flow therethrough to the evaporator 16. The other one of the pair of the refrigerant pipes 164a, 164b allows the refrigerant, which flows from the evaporator 16, to flow therethrough. The connector 165 is attached to the other ends of the pair of refrigerant pipes 164a, 164b. The pair of refrigerant pipes 164a, 164b corresponds to the first pipe connected to the first heat exchanger. The connector 165 corresponds to the connector attached to the first pipe.

The heater core 18 is arranged in the warm air passage 123. The heater core 18 heats the air flowing out of the evaporator 16 and flowing through the warm air passage 123. The heater core 18 is a second heat exchanger that is configured to heat the air by a heat exchange between the air and the heat medium. As the heat medium, engine cooling water, i.e., warm water, is used.

The structure of the heater core 18 is the same as that of a well-known heating heat exchanger mounted to an air conditioner for a vehicle. Specifically, the heater core 18 includes a core 181, a first header tank 182, and a second header tank 183. The first header tank 182 and the second header tank 183 are connected to one end and the other end of the core 181 respectively. The heater core 18 is arranged in the warm air passage 123 so that the first header tank 182 is located above the second header tank 183.

The core 181 of the heater core 18 includes a plurality of warm water tubes and a plurality of fins. The warm water tubes each are in fluid communication with the header tanks 182, 183. The warm water tubes and the fins are stacked alternately with each other. The core 181 has a structure in which the warm water tubes and the fins are alternately stacked in the vehicle width direction DR3. According to this structure, the core 181 allows the air, which flows into the core 181, to pass therethrough while being heated. In the present embodiment, the warm water tubes each are arranged to be inclined with respect to the up-down direction DR 1.

As shown in FIG. 1, a pair of warm water pipes 184a, 184b is connected to the heater core 18. The pair of warm water pipes 184a, 184b each allows the warm water to flow therethrough. The pair of warm water pipes 184a, 184b are positioned outside the air conditioning case 12. In the present embodiment, the warm water pipe 184a is connected to the first header tank 182. The warm water pipe 184b is connected to the second header tank 183. One of the pair of the warm water pipes 184a, 184b allows the warm water to flow therethrough to the heater core 18. The other one of the pair of the warm water pipes 184a, 184b allows the warm water, which flows from the heater core 18, to flow therethrough. The pair of warm water pipes 184a, 184b corresponds to the second pipe that is connected to the second heat exchanger and that allows the heat medium to flow therethrough.

As shown in FIG. 2, the air mixing door 20 is a pivot door positioned in the air conditioning case 12. The air mixing door 20 is a passage door that is configured to open and close the warm air passage 123 and the cool air passage 124. The air mixing door 20 has a rotary shaft 201 and a door body 202. The rotary shaft 201 extends along a longitudinal axial direction parallel to the vehicle width direction DR3. The door body 202 is a plate in shape and is connected to the rotary shaft 201. The air mixing door 20 is positioned upstream of the warm air passage 123 and the cool air passage 124. When the air mixing door 20 rotates around the rotary shaft 201, the door body 202 opens and closes the warm air passage 123 and the cool air passage 124. The air mixing door 20 adjusts an air volume ratio between the air flowing through the warm air passage 123 and the air flowing through the cool air passage 124 according to its rotational position.

The air after passing through the evaporator 16 flows to the warm air passage 123 and the cool air passage 124 at an air flow rate being set correspondingly depending on the rotational position of the air mixing door 20. The warm air, which passes through the warm air passage 123 and heated in the heater core 18, and the cool air, which passes through the cool air passage 124, are mixed in the air mixing space 125 and flows into the vehicle compartment. The air mixing space 125 is defined in the air conditioning case 12 to be in fluid communication with both of the warm air passage 123 and the cool air passage 124. In this way, a temperature of the air, which flows into the air conditioning case 12, is adjusted depending on the rotational position of the air mixing door 20 so that the air is supplied to the vehicle compartment as the conditioned air.

The air conditioning case 12 includes air outlets 131, 132 that discharge the conditioned air of which temperature is adjusted. The air outlets 131, 132 each are connected to the air mixing space 125. The conditioned air after flowing through the air mixing space 125 flows into the vehicle compartment through at least one of the air outlets 131, 132. The air outlets 131, 132 include a face outlet 131 and a foot outlet 132. The face outlet 131 discharges the conditioned air toward an upper body of a passenger having the rear seat in the vehicle compartment. The foot outlet 132 discharges the conditioned air toward feet of the passenger having the rear seat in the vehicle compartment.

The outlet door 22 is a pivot door disposed in the air conditioning case 12. The outlet door 22 is positioned upstream of the face outlet 131 and the foot outlet 132 in the flow direction of air. The outlet door 22 includes a rotary shaft 221 and a door body 222. The rotary shaft 221 extends along a longitudinal axial direction parallel to the vehicle width direction DR3. The door body 222 is a plate in shape and is connected to the rotary shaft 221. When the outlet door 22 rotates around the rotary shaft 221, the door body 222 opens and closes the face outlet 131 and the foot outlet 132.

Figure 3:
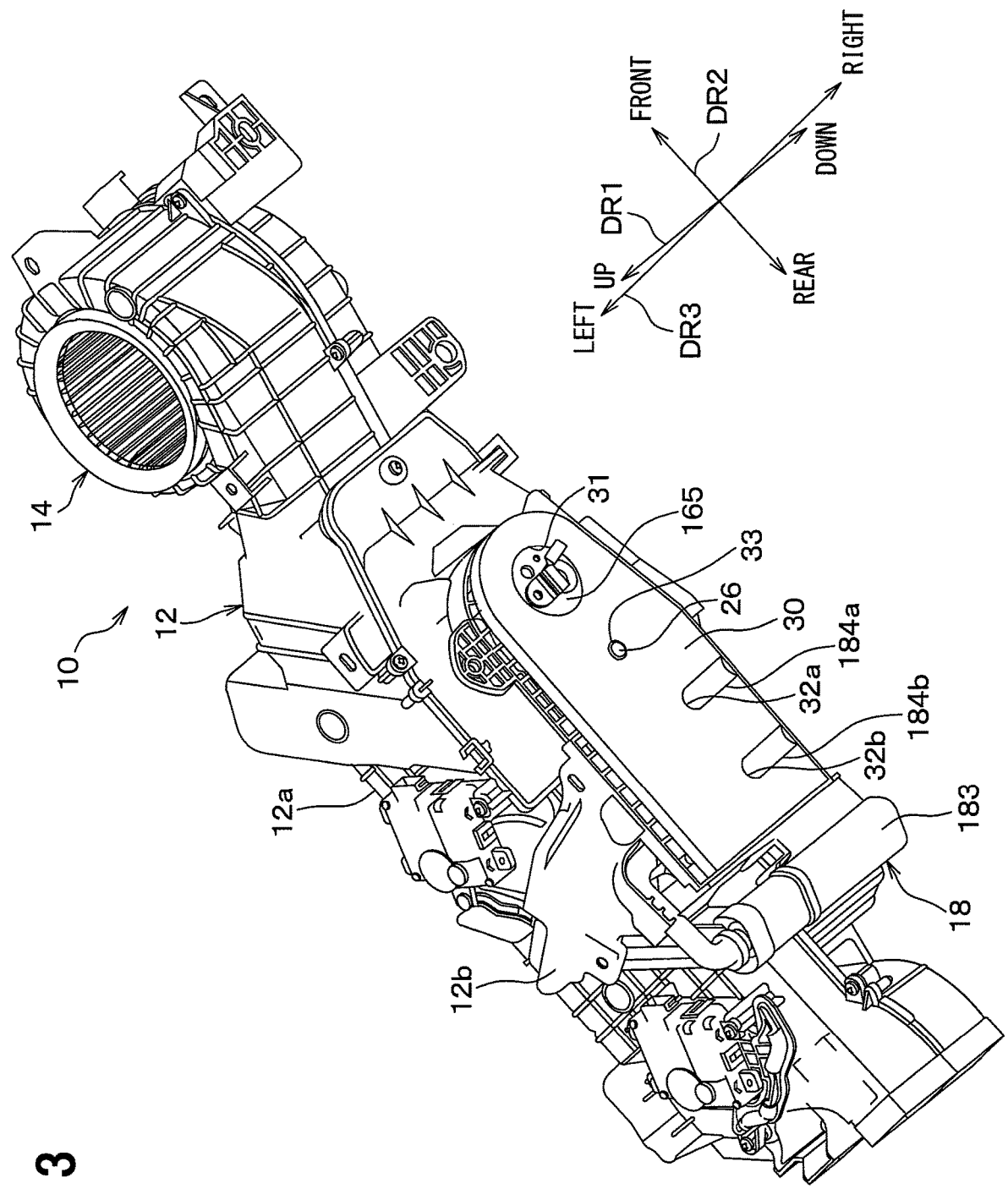
FIG. 3 is a perspective view of the air conditioning unit illustrated in FIG. 1.

As shown in FIG. 3, the air conditioning unit 10 includes a gasket 30 that is a sheet in shape. The gasket 30 is a sealing member that is configured to maintain sealing performance. The gasket 30 is entirely made of a single material. In the present embodiment, the gasket 30 is made of urethane foam. The gasket 30 is fixed to the air conditioning case 12. The gasket 30 is interposed between a partition member 40 of a vehicle body and the air conditioning case 12 as described later.

Figure 4:
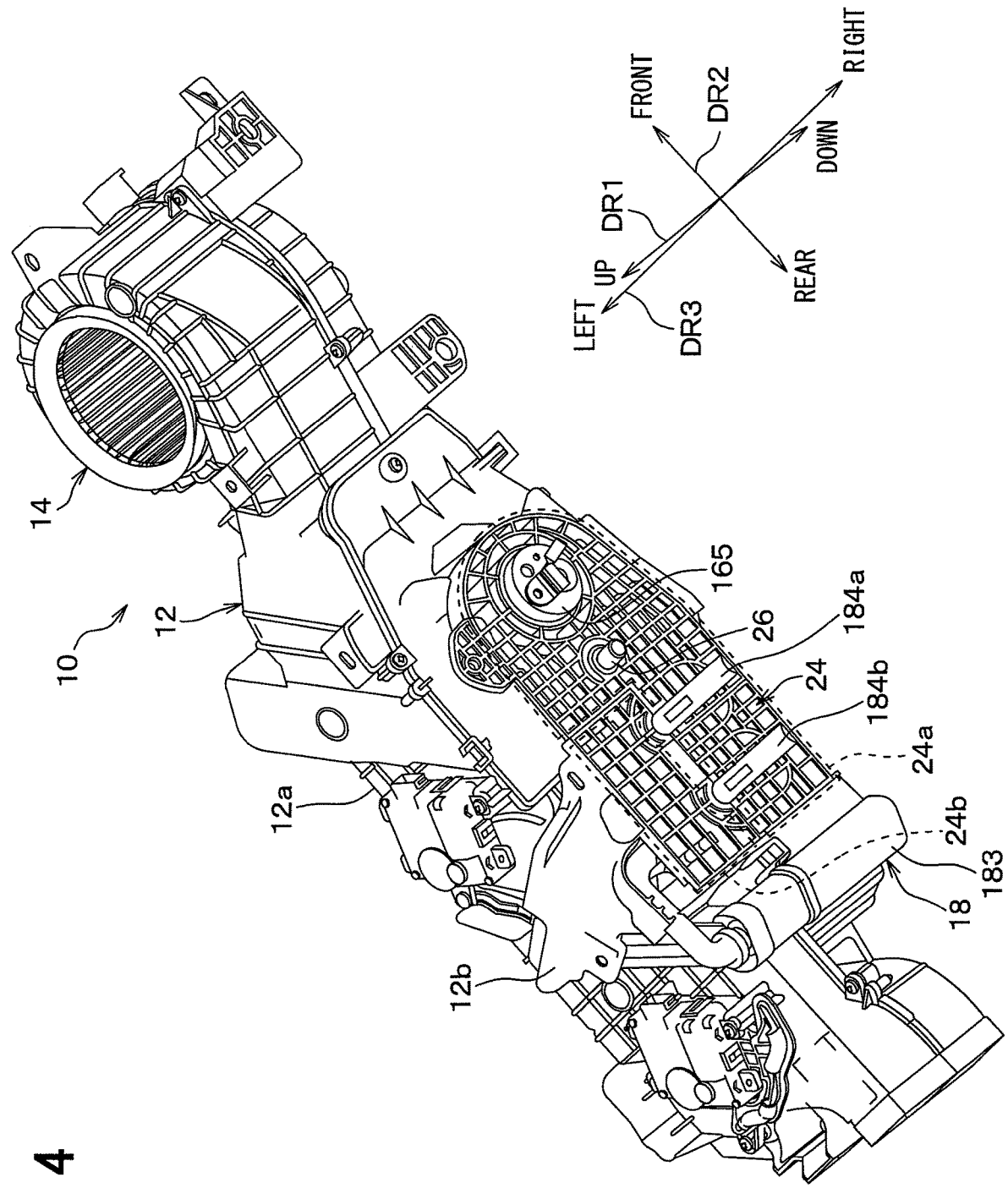
FIG. 4 is a diagram corresponding to FIG. 3 and is a perspective view of the air conditioning unit without a gasket.

As shown in FIG. 4, the air conditioning case includes a contact surface 24 to which the gasket 30 is attached. The gasket 30 is positioned on the contact surface 24. The contact surface 24 is a planar portion that comes in contact with the gasket 30. The contact surface 24 is not a flat surface in the present embodiment, however may be a flat surface.

The connector 165, a drain 26, and a pair of the warm water pipes 184a, 184b are positioned in the contact surface 24. The drainage portion 26 is configured to discharge condensed water, which is generated in the evaporator 16, to the outside of the air conditioning case 12. The drain 26 is tubular in shape. The drain 26 is formed by a part of the air conditioning case 12. The connector 165, the warm water pipe 184a, and the warm water pipe 184b are positioned inside different openings defined in the contact surface 24 respectively. As a result, each of the connector 165, the warm water pipe 184a, and the warm water pipe 184b is surrounded by the respective opening defined in the contact surface 24. Each of the connector 165, the drain 26, and the warm water pipes 184a, 184b protrudes from the contact surface 24. In the present embodiment, the drain 26 and the warm water pipes 184a, 184b extend downward from the contact surface 24.

Figure 5:
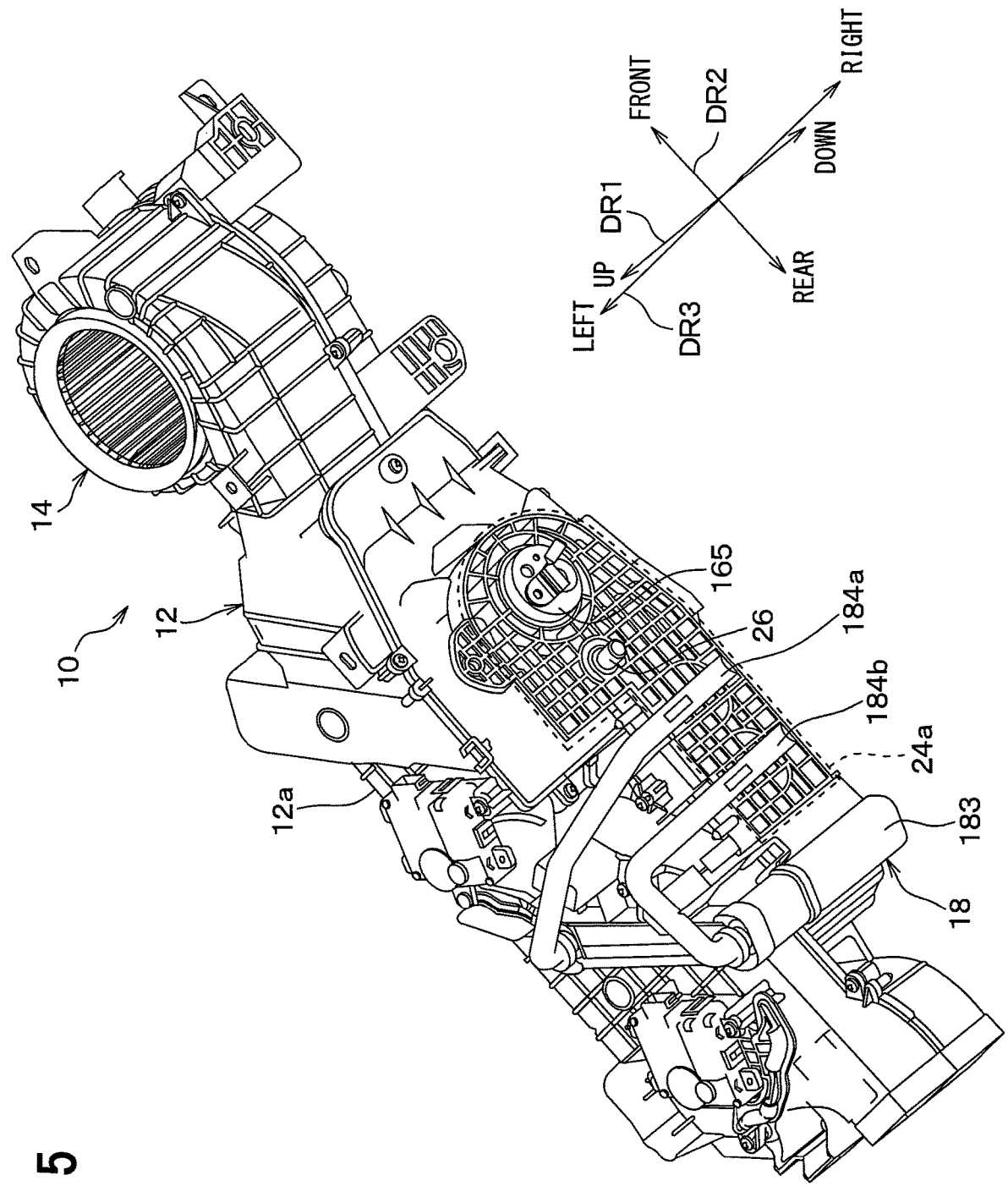
FIG. 5 is a diagram corresponding to FIG. 3 and is a perspective view of the air conditioning unit without neither a gasket nor a heater cover.

As shown in FIG. 4, the air conditioning case 12 includes a case body 12a and a heater cover 12b. The case body 12a defines a case passage 121 therein. As obvious from a comparison between FIG. 4 and FIG. 5, the heater cover 12b covers the pair of the warm water pipes 184a, 184b. The contact surface 24 is formed by a part of a surface 24a of the case body 12a and a part of a surface 24b of the heater cover 12b. The pair of warm water pipes 184a, 184b is interposed between the case body 12a and the heater cover 12b.

As shown in FIG. 3, the gasket 30 includes one first opening 31, two second openings 32a, 32b, and one third opening 33. The connector 165 is positioned inside the first opening 31. The warm water pipes 184a, 184b are positioned inside the second openings 32a, 32b respectively. The drain 26 is positioned inside the third opening 33. The gasket 30 is positioned on the contact surface 24 with the drain 26 inserted into the third opening 33. The gasket 30 is adhered to the contact surface 24 by an adhesive as described later.

Figure 6:
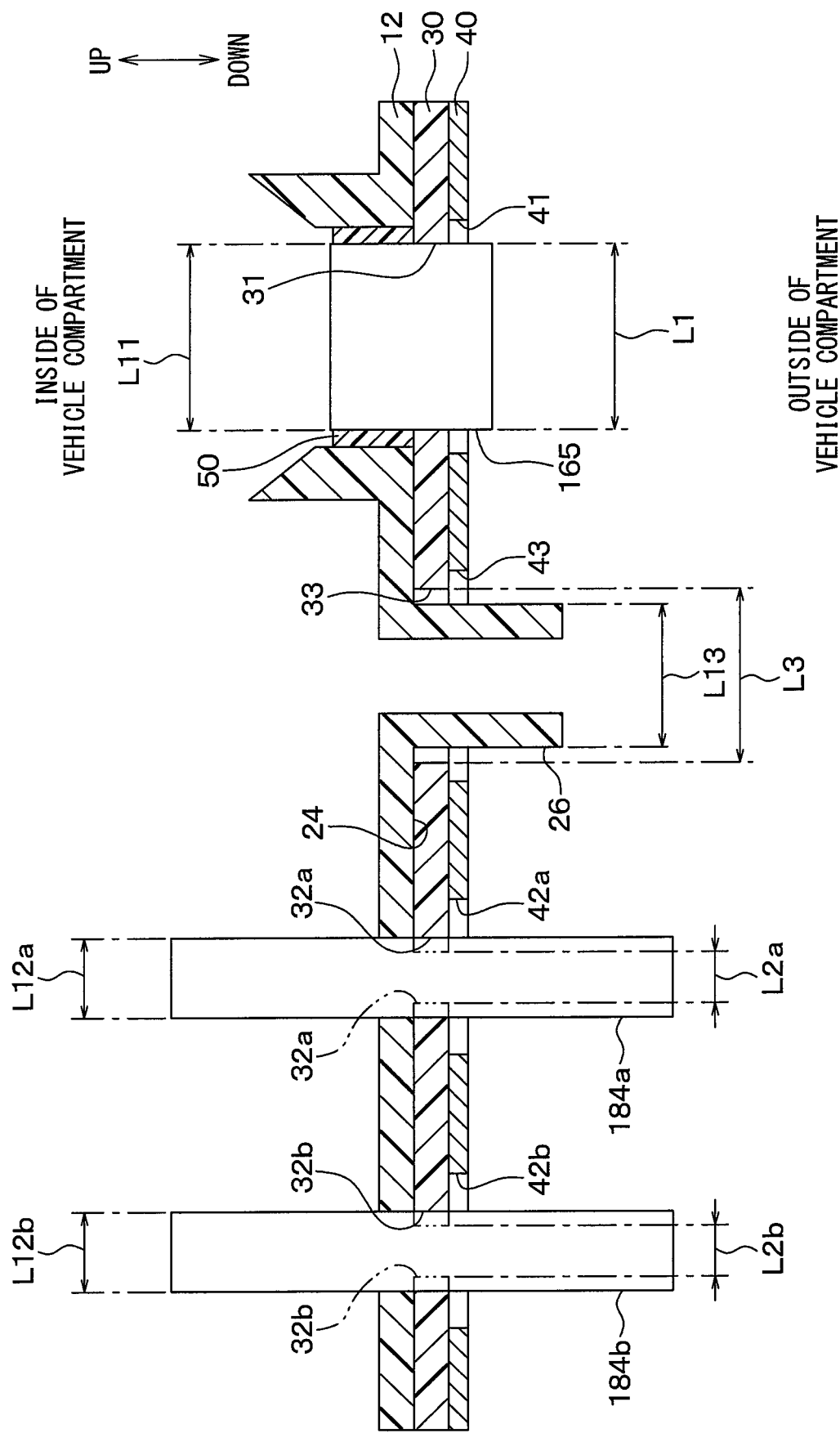
FIG. 6 is an enlarged cross-sectional view of the gasket shown in FIG. 1 with the gasket interposed between a partition member and an air conditioning case.

As shown in FIG. 6, the partition member 40 includes one first through-hole 41, two second through-holes 42a, 42b, and one third through-hole 43. The partition member 40 is a member included in the vehicle body and separates an inside of the vehicle compartment and an outside of the vehicle compartment facing each other in the up-down direction DR1. The air conditioning unit 10 is arranged on the partition member 40 with the connector 165 inserted into the first through-hole 41, with the warm water pipes 184a, 184b inserted into the second through-holes 42a, 42b respectively, and with the drain 26 inserted into the third through-hole 43. As such, the gasket 30 is interposed between portions of the partition member 40, which are proximate to the through-holes 41, 42a, 42b, 43 respectively, and the air conditioning case 12. In this state, the gasket 30 is compressed. When the gasket 30 is compressed, the through-holes 41, 42a, 42b, 43 of the partition member 40 are sealed. That is, when the gasket 30 is compressed, foreign materials such as air and water is prevented from coming into the inside of the vehicle compartment from the outside of the vehicle compartment.

Sizes of the openings 31, 32a, 32b, 33 in a gasket 30 and areas to which the adhesive is applied will be described hereafter.

As shown in FIG. 6, the first opening 31 has an opening width L1 equal to an outer dimension L11 of the connector 165. As such, when the connector 165 is connected to a connection member (not shown) of an object after mounting the air conditioning unit 10 to the vehicle, the gasket 30 is prevented from being interposed between the connector 165 and the connection member of the object. The opening width L1 of the first opening 31 may be greater than the outer dimension L11 of the connector 165. A periphery of the connector 165 is sealed gas-tightly by another gasket 50 that is interposed between the opening of the air conditioning case 12, into which the connector 165 is inserted, and the connector 165.

As shown in FIG. 6 with the two-dot line, an opening width L2a of the second opening 32a without the warm water pipe 184a inserted into the second opening 32a is smaller than an outer diameter L12a of the warm water pipe 184a. Similarly, as shown in FIG. 6 with the two-dot line, an opening width L2b of the second opening 32b without the warm water pipe 184b inserted into the second opening 32b is smaller than an outer diameter L12b of the warm water pipe 184b. Therefore, as shown in FIG. 6 by the solid line, the second openings 32a, 32b are expanded with the warm water pipes 184a, 184b inserted into the second openings 32a, 32b. That is, peripheral portions of the second openings 32a, 32b of the gasket 30 are compressed in the direction away from the warm water pipes 184a, 184b by the warm water pipes 184a, 184b.

As described above, the warm water pipes 184a, 184b are positioned outside the air conditioning case 12. As such, when water enters from peripheries of the warm water pipes 184a and 184b, the water comes into the vehicle compartment. Then, the opening widths L2a, L2b of the second openings 32a, 32b are set to be smaller than the outer diameters L12a, L12b of the warm water pipes 184a, 184b respectively in order to seal the peripheries of the warm water pipes 184a, 184b.

The third opening 33 has an opening width L3 that is greater than an outer diameter L13 of the drain 26. The opening width L3 may be equal to the outer diameter 13 of the drain 26.

Figure 7:
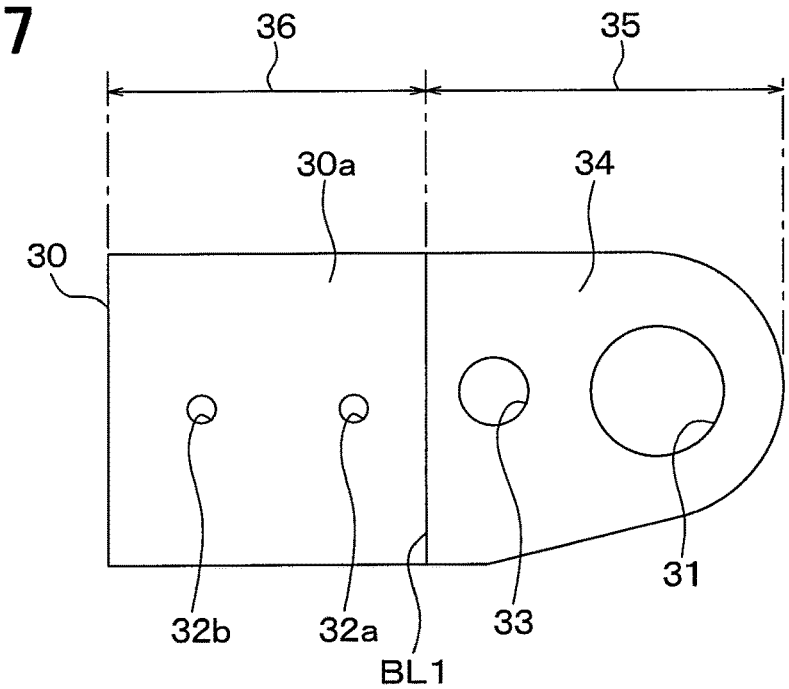
FIG. 7 is a plan view of the gasket in FIG. 1 in a state before being fixed to the air conditioning case.
Figure 8:
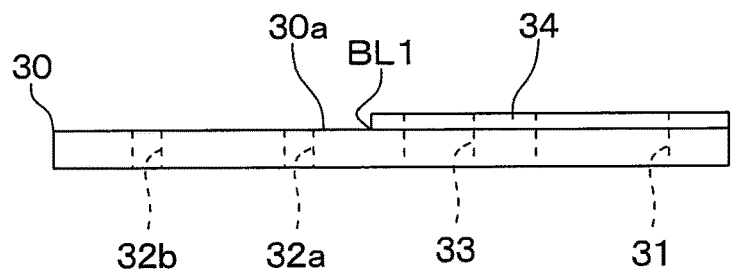
FIG. 8 is a side view of the gasket shown in FIG. 7.

As shown in FIG. 7 and FIG. 8, the surface 30a of the gasket 30 adjacent to the air conditioning case 12 includes an adhesive area 35 and an adhesive-less area 36. The adhesive is applied to the adhesive area 35. The adhesive is not applied to the adhesive-less area 36.

A boundary BL between the adhesive area 35 and the adhesive-less area 36 is defined in the surface 30a of the gasket 30. The boundary BL is located between the first opening 31 and the second openings 32a, 32b in the surface 30a. The boundary BL divides the surface 30a into a first-opening-side area including the first opening 31 and a second-opening-side area including the second openings 32a, 32b. The adhesive area 35 is a whole of the first-opening-side area. The adhesive-less area 36 is a whole of the second-opening-side area.

In the present embodiment, a double-sided tape 34 is attached to the adhesive area 35. In the double-sided tape 34, a gluing agent as the adhesive is attached to both surfaces of a sheet-shaped substrate. The adhesive area 35 is defined as an area of the surface 30a of the gasket 30 to which the double-sided tape 34 is attached. The double-sided tape 34 has a linear end located on the surface 30a. The boundary BL is defined as a boundary line between the linear end and the surface 30a.

Figure 9:
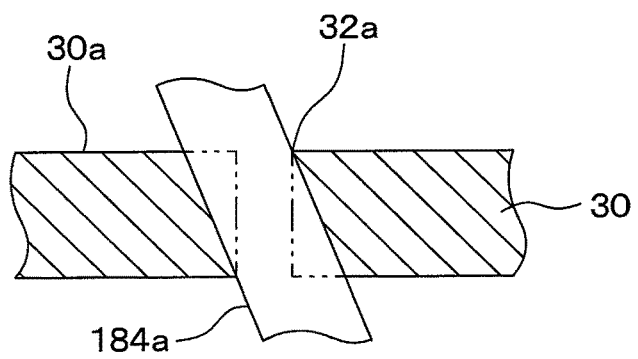
FIG. 9 is a cross-sectional view of the gasket with a warm-water pipe inserted into a second opening.

As shown in FIG. 9, the warm water pipe 184a extends to be inclined with respect to the surface 30a of the gasket 30 inside the second opening 32a. FIG. 9 is a cross-sectional view of the gasket 30 taken along a line different from that of the cross-sectional view shown in FIG. 6. As shown in FIG. 9 by the two-dot line, the second opening 32a extends perpendicularly to the surface 30a before the warm water pipe 184a is inserted into the second opening 32a. A structure of the warm water pipe 184b is the same as that of the warm water pipe 184a. A structure of the second opening 32b is the same as that of the second opening 32a.

Therefore, when the warm water pipes 184a, 184b are inserted into the second openings 32a, 32b respectively, the second openings 32a, 32b are deformed from shapes shown by the two-dot chain line to shapes shown by the solid line. With this arrangement as well, when the warm water pipes 184a, 184b are inserted into the second openings 32a, 32b respectively, the peripheries of the second openings 32a, 32b of the gasket 30 are compressed by the warm water pipes 184a, 184b.

Next, a procedure of assembling the air conditioning unit 10 to the vehicle body will be described.

The air conditioning unit 10 in the state shown in FIG. 4 before the gasket 30 is attached and the gasket 30 in the state shown in FIG. 7 to which the double-sided tape 34 is attached are prepared separately.

Subsequently, as shown in FIG. 3, the gasket 30 is assembled to the air conditioning case 12. At this time, the connector 165 is inserted into the first opening 31. The warm water pipes 184a, 184b are inserted into the second openings 32a, 32b respectively. The drain 26 is inserted into the third opening 33. The gasket 30 is adhered to the contact surface 24 by the double-sided tape 34.

Subsequently, as shown in FIG. 6, the air conditioning unit 10 is mounted to the partition member 40. At this time, the gasket 30 is interposed between the air conditioning case 12 and the partition member 40. As a result, the gasket 30 is compressed.

Subsequently, a warm water hose (not shown) is connected to the pair of warm water pipes 184a, 184b. The connector 165 is connected to the connection member of the object. In this way, the air conditioning unit 10 is assembled to the vehicle body.

As described above, the air conditioning unit 10 of the present embodiment includes the air conditioning case 12, the evaporator 16 and the heater core 18 arranged inside the air conditioning case 12. The air conditioning case 12 includes the contact surface 24. The gasket 30 is positioned on the contact surface 24. The connector 165 attached to the pair of refrigerant pipes 164a, 164b, which is connected to the evaporator 16, and the pair of warm water pipes 184a, 184b, which is connected to the heater core 18, each are mounted to the contact surface 24 to protrude from the contact surface 24. The connector 165 and the pair of warm water pipes 184a, 184b are positioned to be close to each other. As such, the single gasket 30 being the sheet in shape is used.

The gasket 30 includes the first opening 31 and the second openings 32a, 32b. The gasket 30 is adhered to the contact surface 24 by the adhesion with the connector 165 inserted into the first opening 31 and with the warm water pipes 184a, 184b inserted into the second openings 32a, 32b respectively. The opening width L1 of the first opening 31 is the same as the outer dimension L11 of the connector 165. The opening width L2a of the second opening 32a before the warm water pipe 184a is inserted into the second opening 32a is smaller than the outer diameter of the warm water pipe 184a. As such, the portions of the gasket 30, which surround the second openings 32a, 32b respectively with the warm water pipes 184a, 184b inserted into the second openings 32a, 32b, are compressed by the warm water pipes 184a, 184b in the direction away from the warm water pipes 184a, 184b. That is, the peripheries of the second openings 32a, 32b in the gasket 30 each are compressed in the direction away from the warm water pipes 184a, 184b. The surface 30a of the gasket 30 includes the adhesive area 35 and the adhesive-less area 36. The adhesive area 35 includes the periphery of the first opening 31. The adhesive-less area 36 includes the periphery of the second openings 32a, 32b.

As such, the first-opening-side area defined in the surface 30a of the gasket 30 is fixed to the air conditioning case 12 by the adhesive. The second-opening-side area defined in the surface 30a of the gasket 30 is fixed to the air conditioning case 12 with the gasket 30 being pressed against the warm water pipes 184a, 184b. Thus, according to the air conditioning unit 10 of the present embodiment, the gasket 30 can be fixed to the air conditioning case 12 certainly. That is, according to the air conditioning unit 10, when the air conditioning unit 10 is mounted to the partition member 40, it is possible to prevent the gasket 30 from separating from the contact surface 24.

In addition, in the air conditioning unit 10 of the present embodiment, a part of the surface 30a of the gasket 30 proximate to the second openings 32a, 32b serves as the adhesive-less area to which the adhesive is not applied. As a result, when assembling the gasket 30 to the air conditioning case 12, the warm water pipes 184a, 184b can be prevented from being stuck by the adhesion. Thus, according to the air conditioning unit 10, fixing the gasket 30 to the air conditioning case 12 can be improved.

Furthermore, in the air conditioning unit 10 of the present embodiment, the second openings 32a, 32b extend perpendicularly to the surface 30a of the gasket 30 before the second pipes 184a, 184b are inserted into the second openings 32a, 32b. The warm water pipes 184a, 184b extend to be inclined with respect to the surface 30a when being inserted into the second openings 32a, 32b respectively. As such, when the warm water pipes 184a, 184b are inserted into the second openings 32a, 32b respectively, the peripheries of the second openings 32a, 32b in the gasket 30 are compressed by the warm water pipes 184a, 184b. As a result, the gasket 30 is fixed to the air conditioning case 12 more certainly as compared with the case where the warm water pipes 184a, 184b extend perpendicularly to the surface 30a.

In addition, in the air conditioning unit 10 of the present embodiment, the surface 30a of the gasket 30 includes the adhesive area 35 and the adhesive-less area 36 that are defined by the boundary BL1 located between the first opening 31 and the second openings 32a, 32b. The boundary BL divides the surface 30a into the first-opening-side area including the first opening 31 and the second-opening-side area including the second openings 32a, 32b. The adhesive area 35 is a whole of the first-opening-side area. The adhesive-less area 36 is a whole of the second-opening-side area.

Figure 10:
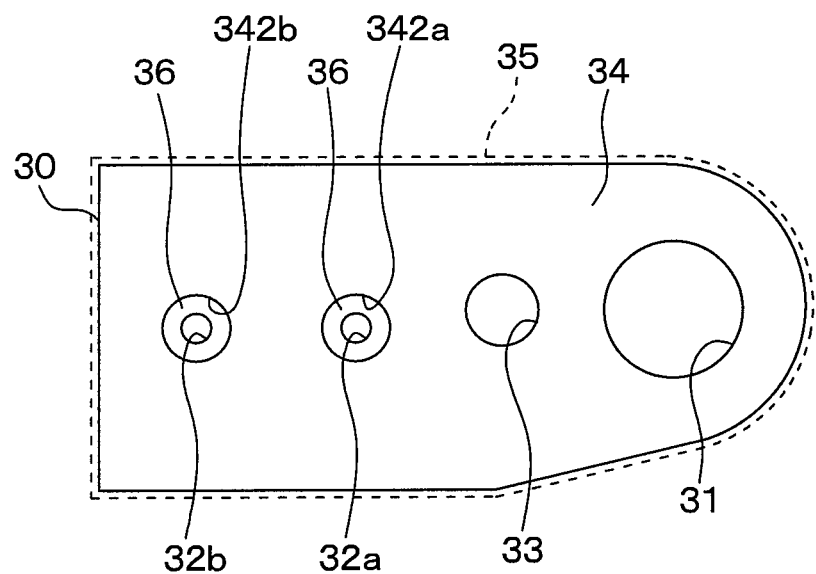
FIG. 10 is a plan view of a gasket in a modified example of the first embodiment.
Figure 11:
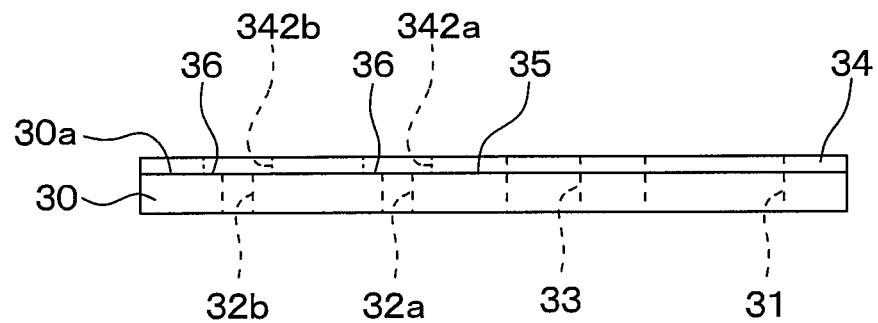
FIG. 11 is a side view of the gasket illustrated in FIG. 10.

Here, the adhesive area 35 and the adhesive-less area 36 may be defined differently from the present embodiment. For example, as shown in FIG. 10 and FIG. 11, the adhesive area 35 may be a whole of the surface 30a excluding the peripheries of the second openings 32a, 32b. The adhesive-less area 36 may be only the peripheries of the second openings 32a, 32b in the surface 30a. In the gasket 30 shown in FIG. 10 and FIG. 11, the double-sided tape 34 is stuck to a whole of the surface 30a excluding the peripheries of the second openings 32a, 32b. As shown in FIG. 10, the adhesive area 35 is an area surrounded by a dashed line along an outer shape of the gasket 30, and is an area not including the peripheries of the second openings 32a, 32b. The same effects as the present embodiment can be obtained in this case as well.

However, the inventors of the present disclosure found that the productivity of the gasket 30 may deteriorate when only the peripheries of the second openings 32a, 32b in the surface 30a are set as the adhesive-less area 36.

In this case, it is necessary to form openings 342a, 342b, which are greater than the second openings 32a, 32b, in to the double-sided tape 34. Therefore, in manufacturing the gasket 30, it is necessary to perform the following processes of: (i) die cutting the sheet material, which forms the gasket 30, to form openings such as the second openings 32a, 32b; and (ii) die cutting the sheet material, which forms the double-sided tape 34, to form openings such as the openings 342a, 342b.

Subsequently, the sheet material of the double-sided tape 34, which include the openings formed therein, is attached to the sheet material of the gasket 30, which includes the openings formed therein. At this time, the openings of the gasket 30 and the openings of the double-sided tape 34 are aligned correspondingly.

Thereafter, die-cutting is performed with the sheet material of the gasket 30 coupled with the sheet material of double-sided tape 34. Accordingly, the gasket 30 being a flat sheet in shape is manufactured.

Thus, the above-described three die-cuttings may be necessarily performed when the adhesive-less area 36 is defined to be only the peripheries of the second openings 32a, 32b in the surface 30a. Further, the alignment of the openings is required to be performed with high accuracy when the sheet material of the double-sided tape 34 is stuck to the sheet material of the gasket 30. Therefore, the productivity of the gasket 30 may deteriorate.

In contrast, in the present embodiment, the gasket 30 having a specified shape shown in FIG. 7 can be manufactured by the following procedure. The sheet material of the double-sided tape 34 is adhered to the sheet material of the gasket 30 so that a whole of the first-opening-side area of the gasket 30 including the first opening 31 is covered with the double-sided take 34. Thereafter, die-cutting is performed with the sheet material of the gasket 30 coupled with the sheet material of double-sided tape 34. As a result, the openings are formed in the gasket 30 and the double-sided tape 34 while forming the gasket 30 to have the specified shape shown in FIG. 7.

Therefore, according to the present embodiment, it is possible to reduce the number of die-cutting processes. That is, it is possible to reduce a quantity of Thomson molds used for the die-cutting processes. Furthermore, when the sheet material of the double-sided tape 34 is adhered to the sheet material of the gasket 30, the alignment of the sheet materials of the gasket 30 and the double-sided tape 34 is not required to be performed with high accuracy. Therefore, according to the present embodiment, the gasket 30 with the double-sided tape 34 adhered thereto can be manufactured easily as compared with the case where only the peripheries of the second openings 32a, 32b in the surface 30a is defined as the adhesive-less area 36. As such, the productivity of the air conditioning unit 10 can be improved.

OTHER EMBODIMENTS (1) The gasket 30 is made of urethane foam in the first embodiment, however the material is not limited to be urethane foam. The gasket 30 may be made of a foamed synthetic resin other than urethane foam.

(2) The warm water pipes 184a, 184b extend to be inclined with respect to the surface 30a when being inserted into the second openings 32a, 32b respectively in the present embodiment, however it should be understood that it is an example. For another example, the warm water pipes 184a, 184b may extend perpendicularly to the surface 30a.

(3) The double-sided tape 34 is attached to the surface 30a of the gasket 30 in the first embodiment, however it should be understood that it is an example. For another example, the adhesive may be applied directly to the surface 30a of the gasket 30. In this case, the adhesive area and the adhesive-less area may be defined as the same as that in the first embodiment shown in FIG. 7 and FIG. 8 preferably. This case also improves the productivity of the gasket 30. This is because the wider the adhesive-less area is, the easier applying the adhesive is.

(4) In the first embodiment, the adhesive area 35 and the adhesive-less area 36 are set as shown in FIG. 7 and FIG. 8. In the modification example of first embodiment, the adhesive area 35 and the adhesive-less area 36 are set as shown in FIG. 10 and FIG. 11. However, the adhesive area 35 and the adhesive-less area 36 are not limited be defined as in the first embodiment and the modification example thereof. The adhesive area may include at least a part of the periphery of the first opening 31 in the surface 30a. As a result, the first-opening-side area of the surface 30a of the gasket 30 including the first opening 31 can be fixed to the air conditioning case 12. The adhesive-less area may include at least a part of the surface 30a including the peripheries of the second openings 32a, 32b. As a result, when assembling the gasket 30 to the air conditioning case 12, the warm water pipes 184a, 184b can be prevented from being stuck by the adhesion.

(5) The air conditioning unit 10 of the first embodiment is for the rear seat, however it should be understood that it is an example of the present disclosure. The air conditioning unit 10 may be an air conditioning unit that is positioned in a front area of the vehicle compartment and that supplies the conditioned air from the instrument panel.

The present disclosure is not limited to the foregoing description of the embodiments and can be modified within the scope of the present disclosure. The present disclosure may also be varied in many ways. Such variations are not to be regarded as departure from the disclosure, and all such modifications are intended to be included within the scope of the disclosure. Individual elements or features of a particular embodiment are generally not limited to that particular embodiment, but, where applicable, are interchangeable and can be used in a selected embodiment, even if not specifically shown or described. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

CONCLUSION

In an aspect of at least one of the above-described embodiments, the gasket includes a surface adjacent to the air conditioning case. The surface includes an adhesive area and an adhesive-less area. The adhesive area includes at least a periphery of the first opening and is with the adhesion applied thereon. The adhesive-less area includes at least a periphery of the second opening and is without the adhesion applied thereon.

In a second aspect, the second opening extends perpendicularly to the surface of the gasket before the second pipe is inserted into the second opening. The second pipe extends to be inclined with respect to the surface of the gasket when being inserted into the second opening. This structure may be employed preferably in addition to a structure that the opening width of the second opening is set smaller than the outer diameter of the second pipe before the second pipe is inserted into the second opening such that the part of the gasket proximate to the second opening is compressed by the second pipe.

In a third aspect, the adhesive area may be a whole of the first-opening-side area of the surface in the gasket defined by the boundary to include the first opening. The adhesive-less area is a whole of the second-opening-side area of the surface in the gasket defined by the boundary to include the second opening. The boundary is located between the first opening and the second opening in the surface of the gasket. As such, the adhesive can be applied easily as compared to the case where only the periphery of the second opening is defined as the adhesive-less area. Thus, the productivity of the air conditioning unit can be improved.

What is claimed is:

1. An air conditioning unit for a vehicle that supplies a conditioned air into a vehicle compartment, comprising:
   an air conditioning case that defines an air passage therein allowing air to flow therethrough toward the vehicle compartment;
   a first heat exchanger in the air conditioning case, the first heat exchanger being configured to cool the air by a heat exchange between the air and a refrigerant circulating in a refrigeration circuit;
   a first pipe that is connected to the first heat exchanger and allows the refrigerant to flow therethrough;
   a connector that is attached to an end of the first pipe and connects the first pipe to an object;
   a second heat exchanger in the air conditioning case, the second heat exchanger being configured to heat the air by a heat exchange between the air and a heat medium;
   a second pipe that is connected to the second heat exchanger and allows the heat medium to flow therethrough; and
   a gasket that is a sheet in shape, the gasket being interposed between a partition member and the air conditioning case and fixed to the air conditioning case, the partition member partitioning an inside of the vehicle compartment and an outside of the vehicle compartment, wherein
   the air conditioning case includes a contact surface being in contact with the gasket, the connector and the second pipe each protrude from the contact surface, the gasket includes a first opening and a second opening, the gasket is adhered to the contact surface by an adhesive with the connector inserted into the first opening and with the second pipe inserted into the second opening, the first opening has an opening width greater than or equal to an outer dimension of the connector, a portion of the gasket proximate to the second opening is compressed by the second pipe along a direction away from the second pipe, the gasket includes a surface adjacent to the air conditioning case, and the surface includes an adhesive area that includes at least a periphery of the first opening, the adhesive is applied to the adhesive area, and an adhesive-less area that includes at least a periphery of the second opening, the adhesive is not applied to the adhesive-less area.

2. The air conditioning unit for a vehicle according to claim 1, wherein the second opening extends perpendicularly to the surface of the gasket before the second pipe is inserted into the second opening, and the second pipe extends to incline with respect to the surface of the gasket when being inserted into the second opening.

3. The air conditioning unit for a vehicle according to claim 1, wherein the surface of the gasket is divided into a first-opening-side area and a second-opening-side area by a boundary, the adhesive area is a whole of the first-opening-side area, the adhesive-less area is a whole of the second-opening-side area, and the boundary is located between the first opening and the second opening in the surface of the gasket.

* * * * *